Nov. 6, 1928.
M. L. PATTERSON
1,690,550
SEARCHLIGHT SAFETY MECHANISM
Filed Sept. 3, 1924
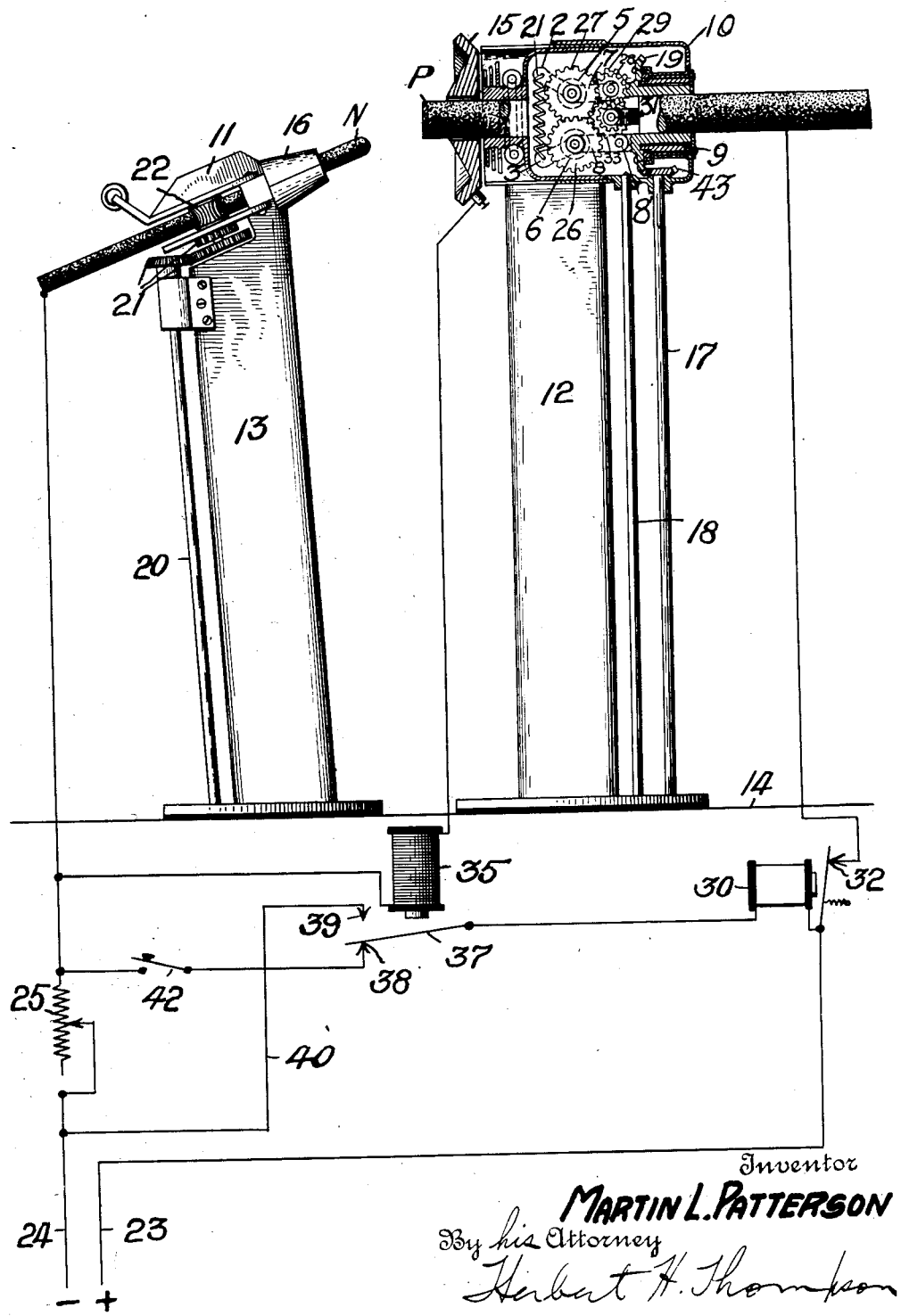
Inventor
MARTIN L. PATTERSON
By his Attorney
Herbert H. Thompson Patented Nov. 6, 1928.

1,690,550

UNITED STATES PATENT OFFICE.

MARTIN L. PATTERSON, OF BOGOTA, NEW JERSEY, ASSIGNOR TO THE SPERRY GYROSCOPE COMPANY, OF BROOKLYN, NEW YORK, A CORPORATION OF NEW YORK.

SEARCHLIGHT SAFETY MECHANISM.

Application filed September 3, 1924. Serial No. 735,633.

This invention relates to searchlights, and more particularly to means for protecting searchlights against damage due to burning out of the electrodes. This condition may arise when either electrode fails to feed inwardly toward the arc and burns back into the head. In carrying out my invention I may utilize either or both of the following methods. First, I may employ the nose-cap through which the electrode extends as a third electrode, so that burning back of an electrode due to improper feeding will cause the arc flame to engage the nose-cap and close a circuit through a trip-coil or other circuit-breaker. Second, I may rely upon the increasing arc voltage, when one or both electrodes fail to feed, to actuate the said circuit-breaker.

Other objects and advantages of my invention will become apparent in the following detailed description thereof taken in connection with the accompanying drawings wherein I have shown, partly diagrammatically, what I now consider the preferred form of my invention applied to a searchlight.

In the said drawing, I have shown parts of a standard searchlight of the Sperry type. These parts include a positive head 10, a negative head 11, and positive and negative supports 12 and 13 mounted upon a control box 14. The positive electrode P extends through the positive head and through a nose-cap 15 adjacent the arcing end. The negative electrode N extends through the negative head and the nose-cap 16. The feeding mechanism for the said electrodes and the rotating mechanism for the positive electrode may be similar to that disclosed in the patent to P. R. Bassett, No. 1,466,419 granted August 28, 1923, to which reference should be had for a full description. Briefly, the positive feeding and rotating mechanism comprises rollers 5 and 6 which grip the positive electrode. The said rollers are mounted on brackets 7 and 8 on crown gear 19 mounted for rotation on annular member 9 integral with the positive head. One of said brackets may be hingedly mounted on said crown gear as at 8' and a spring 21 may be attached to projections 2 and 3 on said brackets for pressing the rollers tightly against the electrode. Rotation of the electrode is accomplished by rod 17 which is driven by a motor within the control box, said rod rotating gears 43 and 19. The feeding is accomplished by rod 18 being interposed in the path of star-wheel 33, causing rotation thereof about its own axis with consequent rotation about their own axes of gears 31, 29, 28, 27, 26. Since gears 26 and 27 are on the same shafts as rollers 5 and 6, rotation of said gears will feed the positive electrode. The interposition of rod 18 in the path of the star-wheel may be controlled in any suitable manner, as by a third electrode shown in said Bassett patent. The negative feed mechanism includes the rod 20, gearing 21, and rollers 22. Current may be supplied from any suitable source, the main supply lines being indicated at 23, 24, and the current may be controlled by a main-line rheostat 25.

The arc may be struck in the usual manner and thereafter the negative electrode is fed inwardly toward the arc continuously while the positive electrode is maintained in a substantially fixed position, as disclosed in the said Bassett patent. If the positive feed should fail for any reason, or said feed should become ineffective as by the outer end of the positive electrode passing beyond the feed-rollers, the negative electrode may continue to feed while the positive electrode burns back into the positive head causing serious damage. On the other hand, the negative feed may fail or become ineffective due to the outer end of the negative electrode passing beyond the feed-rollers 22, so that the negative electrode burns back into the negative head. A third condition may be the failure or ineffectiveness of both the positive and negative feeds.

To guard against all of these contingencies, I provide circuit-breaking means for cutting off current to the arc when one or both of said feeds fail. For this purpose, I may shunt across the main lines 23, 24, beyond the rheostat 25, a trip-coil 30, so that normally only the arc voltage is impressed on said coil. The trip-coil 30 is set to be actuated when the arc voltage is greater than the predetermined normal. Thus, if the positive electrode is maintained in fixed position, and the negative feed fails, thus resulting in lengthening the arc and increasing the arc voltage, the trip-coil will be actuated to break contact 32 in the main line circuit and thus extinguish the arc.

If the positive feed should fail and the positive electrode burn back toward the head, I may utilize the nose-cap 15 as an auxiliary electrode so that when the arc flame touches the nose-cap a circuit will be completed through an electromagnet 35. Energization of said magnet will attract an armature 37 to break the shunt circuit at 38, and make contact at 39 to place the trip-coil 30 in advance of rheostat 25 so that the full voltage of the main line is thus impressed upon the trip-coil 30 which therefore breaks contact 32 in the main line and extinguishes the arc.

Obviously, the above-described system will operate when both feeds fail.

Since in striking the arc it is necessary to employ the full line voltage, a switch 42 is provided whereby the shunt circuit, including the trip-coil 30, is not placed in the circuit until the arc is struck.

In accordance with the provisions of the patent statutes I have herein described the principle and operation of my invention, together with apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a searchlight having a pair of electrodes, means for feeding each of said electrodes, a main electrical supply for the arc circuit, a circuit-breaker comprising a trip-coil set for a predetermined voltage and shunted across the arc, and means actuated by failure of the feeding means of one of said electrodes whereby the full main line voltage is impressed on said coil to break the arc circuit.

2. In a searchlight having a pair of electrodes, means for feeding each of said electrodes, a main electrical supply for the arc circuit, a circuit-breaker comprising a trip-coil set for a predetermined voltage and shunted across the arc, and means actuated by failure of the feeding means of the positive electrode whereby the full main line voltage is impressed on said coil to break the arc circuit.

3. In a searchlight having a pair of electrodes, a support for each electrode, a head carried by each support and through which the respective electrodes extend, an auxiliary electrode positioned in advance of one of said heads, a circuit-breaker comprising a trip-coil set for a predetermined voltage and shunted across the arc, and means adapted to be actuated when the arc flame engages said auxiliary electrode whereby the full main line voltage is impressed on said coil to break the arc circuit.

4. In a searchlight having a pair of electrodes, a support for each electrode, a head carried by each support and through which the respective electrodes extend, a circuit-breaker comprising a trip-coil set for a predetermined voltage and shunted across the arc, and means including a switch and an electromagnet for actuating said switch and adapted to be energized when the arc flame engages said auxiliary electrode whereby the full main line voltage is impressed on said coil to break the arc circuit.

5. In a searchlight having a pair of electrodes, means for feeding each of said electrodes, a main electrical supply for the arc circuit, a rheostat in said circuit, a circuit-breaker comprising a trip-coil set for a predetermined voltage and shunted across the arc, said trip coil being connected to said supply by way of said rheostat, and means actuated by the failure of the feeding means of one of said electrodes whereby said coil is connected directly to said supply and the full main line voltage is impressed on said coil to break the arc circuit.

6. In a searchlight having a pair of electrodes, means for feeding each of said electrodes, a main electrical supply for the arc circuit, a rheostat in said circuit, a circuit-breaker comprising a trip-coil set for a predetermined voltage and shunted across the arc, said trip coil being connected to said supply by way of said rheostat, and means actuated by the failure of the feeding means of the positive electrode, whereby said coil is connected directly to said supply and the full main line voltage is impressed on said coil to break the arc circuit.

7. In a searchlight having a pair of electrodes, a support for each electrode, a head carried by each support and through which the respective electrodes extend, an auxiliary electrode positioned in advance of one of said heads, a main electrical supply for the arc circuit, a rheostat in said circuit, a circuit-breaker comprising a trip-coil set for a predetermined voltage and shunted across the arc, said trip coil being connected to said supply by way of said rheostat, a switch and an electromagnet adapted to be energized when the arc flame engages said auxiliary electrode for actuating said switch to connect said coil directly to said supply and the full main line voltage is impressed on said coil to break the arc circuit.

In testimony whereof I have affixed my signature.

MARTIN L. PATTERSON.